United States Patent
Cristoforetti

(10) Patent No.: US 12,269,686 B2
(45) Date of Patent: Apr. 8, 2025

(54) CURVED BELT CONVEYOR

(71) Applicant: MECHANICA SISTEMI S.R.L., Paderno Dugnano (IT)

(72) Inventor: Giorgio Cristoforetti, Varese (IT)

(73) Assignee: MECHANICA SISTEMI S.R.L., Paderno Dugnano (IT)

( * ) Notice: Subject to any disclaimer, the term of this patent is extended or adjusted under 35 U.S.C. 154(b) by 81 days.

(21) Appl. No.: 18/297,718

(22) Filed: Apr. 10, 2023

(65) Prior Publication Data

US 2023/0331489 A1 Oct. 19, 2023

(30) Foreign Application Priority Data

Apr. 13, 2022 (IT) ........................ 102022000007400

(51) Int. Cl.
| | |
|---|---|
| B65G 15/02 | (2006.01) |
| B65G 21/06 | (2006.01) |
| B65G 21/10 | (2006.01) |
| B65G 23/44 | (2006.01) |

(52) U.S. Cl.
CPC ............. B65G 15/02 (2013.01); B65G 21/06 (2013.01); B65G 21/105 (2013.01); B65G 23/44 (2013.01)

(58) Field of Classification Search
CPC ...... B65G 15/02; B65G 21/06; B65G 21/105; B65G 23/44
USPC .................................................. 198/813–816
See application file for complete search history.

(56) References Cited

U.S. PATENT DOCUMENTS

| | | | | |
|---|---|---|---|---|
| 3,189,165 | A | * 6/1965 | Theijsmeijer | B65G 15/02 |
| | | | | 198/816 |
| 3,217,861 | A | 11/1965 | Daniluk et al. | |
| 4,846,338 | A | * 7/1989 | Widmer | B65G 15/02 |
| | | | | 198/813 |
| 5,143,207 | A | * 9/1992 | Pruett | B65G 23/44 |
| | | | | 198/814 |

(Continued)

FOREIGN PATENT DOCUMENTS

| | | |
|---|---|---|
| EP | 2 455 308 A2 | 5/2012 |
| NL | 9 401 961 A | 7/1996 |

OTHER PUBLICATIONS

Early Search Report in Italian Patent Application No. 102022000007400, dated Nov. 7, 2022.

(Continued)

*Primary Examiner* — Mark A Deuble
(74) *Attorney, Agent, or Firm* — JONES ROBB, PLLC

(57) ABSTRACT

A curved belt conveyor includes a supporting structure having a base for supporting the conveyor on a floor and a curved top portion engaged to the base. The curved top portion defines at least one curved advancing plane for one or more objects and/or articles to be moved along a curvilinear advancing path and has an arched wide side and an arched narrow side opposite each other. An endless conveyor belt is operatively engaged to the curved top portion to define the curved advancing plane and the conveyor belt is at least partially around at least two revolving rollers rotatively engaged to the curved top portion. At least one of the rollers is movable relative to the other between a distant position, wherein the conveyor belt is under tension and not removable from the rollers and a close position, wherein the conveyor belt is loose and removable from the rollers.

20 Claims, 6 Drawing Sheets

(56) References Cited

U.S. PATENT DOCUMENTS

| | | | | |
|---|---|---|---|---|
| 5,988,362 A | * | 11/1999 | Nakamura | B65G 15/02 |
| | | | | 198/816 |
| 7,497,326 B2 | | 3/2009 | McGuire et al. | |
| 2006/0144679 A1 | * | 7/2006 | Wier | B65G 23/04 |
| | | | | 198/860.3 |
| 2017/0210566 A1 | | 7/2017 | Hishinuma | |

OTHER PUBLICATIONS

EP Search Report issued in corresponding European Application No. 23152706.0, dated Sep. 20, 2023.

\* cited by examiner

CURVED BELT CONVEYOR

CROSS-REFERENCE TO RELATED APPLICATIONS

This application claims priority to Italian Patent Application No. 102022000007400, filed on Apr. 13, 2022, the entire content of which is incorporated by reference herein.

BACKGROUND

The present invention relates to a curved belt conveyor.

In particular, the object of the present invention can be used in the industrial field of machines and/or apparatuses for moving and/or sorting objects like boxes or packages that have to be managed, shipped and/or delivered, as for example by logistics and shipping companies, and/or luggage and suitcases to be loaded or unloaded on/from airplanes, ships, trains and/or other means of transport.

In particular, the present invention refers to a curved belt conveyor which can be part of one a more complex machine having different belt conveyors properly connected together to define one or more advancing paths for the objects to be moved.

As disclosed within U.S. Pat. No. 7,497,326, a curved conveyor belt comprises a supporting structure having a base for supporting the curved belt conveyor on a floor and a curved top portion engaged to the base. The curved top portion defines a curved advancing plane for one or more objects and/or articles to be moved along a corresponding curvilinear advancing path. The curved top portion is provided with an arched wide side and an arched narrow side opposite each other.

The curved belt conveyor also comprises an endless conveyor belt engaged to the curved top portion of the supporting structure to define the curved advancing plane of the curved top portion. The endless conveyor belt develops around two revolving rollers rotatively engaged to the curved top portion of the supporting structure. The arched wide side and the arched narrow side of the curved top portion are closed by structural vertical elements.

At the arched narrow side of the curved top portion, the vertical elements are pivotable between a raised position, wherein the arched narrow side is closed, and a lowered position, wherein the arched narrow side is open, allowing the endless belt conveyor to be removed from the curved top portion without dismantling the conveyor frame.

Although U.S. Pat. No. 7,497,326 provides a clever mechanism to make the endless conveyor belt removal easier and simpler than the ones of the state of the art making the endless conveyor belt easily accessible without dismantling and disassembling the conveyor frame, it has to be noted that all the removal operations are difficult to be performed because of the friction forces generated between the revolving rollers and the endless conveyor belt.

The same problem also occurs when a new endless conveyor belt needs to be fitted on the revolving rollers. The friction forces make such operation very difficult and stressful.

The above mentioned difficulties have undesired negative impacts on the time needed for the maintenance operations as well as on the costs related to such operations.

SUMMARY

It is also an objective of the present invention to make easier any assembling and/or disassembling operation of the belt conveyor of the curved conveyor belt.

It is further an objective of the present invention to simplify any maintenance, dismantling, assembling, and/or disassembling operation of the endless conveyor belt.

It is another objective of the present invention to reduce the curved belt conveyor downtime for any maintenance, dismantling, assembling, and/or disassembling operation of the endless conveyor belt.

Also, it is an objective of the present invention to reduce the operating costs for any maintenance, dismantling, assembling, and/or disassembling operation of the endless conveyor belt.

It is further an objective of the present invention to make any maintenance, dismantling, assembling and/or disassembling operation of the endless conveyor belt more comfortable for the operator in charge.

In light of the disclosure set forth herein, and without limiting the disclosure in any way, in a first aspect, which may be combined with any other aspect or portion thereof described herein, a curved belt conveyor comprises: a curved belt conveyor (1) comprising: a supporting structure (2) having a base (3) for supporting the curved belt conveyor (1) on a floor (F) and a curved top portion (4) engaged to the base (3), the curved top portion (4) defining at least one curved advancing plane (5) for one or more objects or articles to be moved along a curvilinear advancing path (P) and being provided with an arched wide side (6) and an arched narrow side (7) opposite each other; an endless conveyor belt (8) operatively engaged to the curved top portion (4) of the supporting structure (2) to define the curved advancing plane (5) of the curved top portion (4), the endless conveyor belt (8) developing at least partially around at least two revolving rollers (9, 10) rotatively engaged to the curved top portion (4) of the supporting structure (2); wherein: at least one revolving roller (9, 10) is movable with respect to the other between a relative distant position wherein the conveyor belt (8) is kept under tension being not removable from the revolving rollers (9, 10) and a relative close position wherein the conveyor belt (8) is loosen, being removable from the revolving rollers (9, 10), optionally through the arched narrow side (7) of the curved top portion (4) of the supporting structure (2).

In a further independent first bis aspect, a curved belt conveyor (1) comprises a curved belt conveyor (1) which comprise: a supporting structure (2) having a base (3) for supporting the curved belt conveyor (1) on a floor (F) and a curved top portion (4) engaged to the base (3), the curved top portion (4) defining at least one curved advancing plane (5) for one or more objects and/or articles to be moved along a curvilinear advancing path (P) and being provided with an arched wide side (6) and an arched narrow side (7) opposite each other; an endless conveyor belt (8) operatively engaged to the curved top portion (4) of the supporting structure (2) to define the curved advancing plane (5) of the curved top portion (4), the endless conveyor belt (8) developing at least partially around at least two revolving rollers (9, 10) rotatively engaged to the curved top portion (4) of the supporting structure (2), at least one revolving roller (9, 10) being movable with respect to the other between a relative distant position wherein the endless conveyor belt (8) is kept under tension being not removable from the revolving rollers (9, 10) and a relative close position wherein the endless conveyor belt (8) is loosen being removable from the revolving rollers, characterized in that the curved top portion (4) of the supporting structure (2) comprises: a plurality of structural rods (24a, 24b, 24c, 24d) configured to define a supporting assembly (25) open in correspondence of the arched narrow side (7) of the curved top portion (4) of the curved belt conveyor (1) and closed at the arched wide side (6) of the curved top portion (4) of the curved belt conveyor (1) by elements (26), wherein the plurality of structural rods (24a, 24b, 24c, 24d) comprises a first plurality of substantially radial structural rods (24a) and a second plurality of substantially radial structural rods (24c) placed below the first plurality of substantially radial structural rods (24a), in working conditions, the endless conveyor belt (8) having an upper portion placed above the first plurality of substantially radial structural rods (24a) and a lower portion placed between the first plurality of substantially radial structural rods (24a) and the second plurality of substantially radial structural rods (24c), each of the first plurality of substantially radial structural rods (24a) and each of the second plurality of substantially radial structural rods (24c) having a free end in correspondence of the arched narrow side (7) of the curved top portion, the free ends of the first plurality of substantially radial structural rods (24a) being not connected to the free ends of the second plurality of substantially radial structural rods (24c) at the arched narrow side (7) allowing endless conveyor belt removal through the arched narrow side (7) of the curved top portion (4) of the supporting structure (2); a protective case (28) removably engaged at the arched narrow side (7) of the curved top portion (4) of the curved belt conveyor (1), the supporting assembly (25) being openable at the arched narrow side (7) of the curved top portion (4) of the curved belt conveyor (1) by removing the protective case (28) and being closable at the arched narrow side (7) of the curved top portion (4) of the curved belt conveyor (1) by applying the removable protective case (28).

In an additional independent aspect, a curved belt conveyor (1) is provided and comprises: a supporting structure (2) having a base (3) for supporting the curved belt conveyor (1) on a floor (F) and a curved top portion (4) engaged to the base (3), the curved top portion (4) defining at least one curved advancing plane (5) for one or more objects or articles to be moved along a curvilinear advancing path (P) and being provided with an arched wide side (6) and an arched narrow side (7) opposite each other; an endless conveyor belt (8) operatively engaged to the curved top portion (4) of the supporting structure (2) to define the curved advancing plane (5) of the curved top portion (4), the endless conveyor belt (8) developing at least partially around at least two revolving rollers (9, 10) rotatively engaged to the curved top portion (4) of the supporting structure (2); wherein: the curved top portion (4) of the supporting structure (2) is liftable with respect to the base (3), optionally the arched narrow portion (7) of the curved top portion (4) of the supporting structure (2) is liftable with respect to the base (3), particularly the curved top portion (4) of the supporting structure (2) is swiveling engaged to the base (3) being pivotable between a working position, wherein the endless conveyor belt (8) is substantially horizontal or oriented so that to allow an object or an article to advance along the curved advancing path (P) of the curved top portion (4) and a maintenance position, wherein the arched narrow side (7) is liftable with respect to the base (3) and the arched wide side (6) is turned towards the floor (F).

In the following aspects details are added with regard to both the curved belt conveyor considered in the previous independent aspects.

Each and every aspect relating to the components/elements of each curved belt conveyor are clearly combinable with the aspects of the other curved belt conveyor considered both in the independent aspects and in the dependent aspects.

In a second aspect according to previous aspect, each revolving roller (9, 10) is movable with respect to the other between a relative distant position wherein the conveyor belt (8) is kept under tension, being not removable from the revolving rollers (9, 10) and a relative close position wherein the conveyor belt (8) is loosen, being removable from the revolving rollers (9, 10).

In a third aspect according to the previous aspect, when the revolving rollers (9, 10) are positioned at the relative close position with the conveyor belt (8) loosed, the conveyor belt (8) is removable from the revolving rollers (9, 10) through the arched narrow side (7) of the curved top portion (4) of the supporting structure (2).

In a fourth aspect according to any one of the previous two aspects, a first end (9a, 10a) of each revolving roller (9, 10) is movable along the corresponding arched side (7) towards a middle portion (11) of the curved top portion (4) of the supporting structure (2) from the relative distant position to the relative close position and is movable along the corresponding arched side (7) towards the opposite direction from the relative close position to the relative distant position.

In a fifth aspect according to the previous aspect, wherein the first end (9a, 10a) of each revolving roller (9, 10) faces the arched narrow side (7) of the curved top portion (4) of the supporting structure (2) being movable along the arched narrow side (7) between the relative distant position and the relative close position.

In a sixth aspect according to any one of the previous two aspects, each revolving roller (9, 10) has a second end (9b, 10b) opposite to the corresponding first end (9a, 10a) operatively engaged to the arched wide side (6) of the curved top portion (4) of the supporting structure (2) to allow the corresponding first end (9a, 10a) to be moved between the relative distant position and the relative close position.

In a seventh aspect according to any one of the previous three aspects, wherein each revolving roller (9, 10) is movable between the relative distant position, wherein a corresponding longitudinal axis (X, Y) is substantially perpendicular to at least one of the arched sides (6, 7) of the curved top portion (4) of the supporting structure (2) and the relative close position wherein the corresponding longitudinal axis (X, Y) is inclined with respect to at least one of the arched sides (6, 7) of the curved top portion (4) of the supporting structure (2).

In an eighth aspect according to the any one of the previous aspects, the curved belt conveyor (1) further comprises at least one connection mechanism (12) operatively interposed between one or each revolving roller (9, 10) and a corresponding arched side (6, 7) of the curved top portion (4) of the supporting structure (2), the connection mechanism (12) being switchable between a locking condition wherein the corresponding revolving roller (9, 10) is maintained in a fixed position, particularly corresponding to the relative distant position, and an unlocking condition, wherein the corresponding revolving roller (9, 10) can be moved between the relative distant position and the relative close position.

In a ninth aspect according to the previous aspect, the connecting mechanism (12) is operatively interposed between a first end (9a, 10a), a corresponding revolving roller (9, 10) and a corresponding arched side (6, 7), particularly the arched narrow side (7) of the curved top portion (4) of the supporting structure (2).

In a tenth aspect according to the previous aspect, the connecting mechanism (12) comprises at least one striker plate (13) engageable to a structural bar (14) of the curved top portion (4) of the supporting structure (2).

In an eleventh aspect according to the previous aspect, the striker plate (13) develops from the structural bar (14) of the top portion (4) of the supporting structure (2) in correspondence of the arched narrow side (7) of the curved top portion (4).

In a twelfth aspect according to any one of the previous two aspects, the striker plate (13) engages a corresponding seat (14a) defined on the corresponding structural bar (14) of the top portion (4) of the supporting structure (2).

In a thirteenth aspect according to the previous aspect, the seat (14) of the corresponding structural bar (14) of the top portion (4) of the supporting structure (2) is a through opening made in such a structural bar (14).

In a fourteenth aspect according to any one of the previous two aspects, the striker plate (13) in insertable in the corresponding seat (14a) defined on the corresponding structural bar (14) of the top portion (4) of the supporting structure (2).

In a fifteenth aspect according to any one of the previous three aspects, the striker plate (13) is engaged or inserted, by interference, to/into the corresponding seat (14a) of the corresponding structural bar (14) of the top portion (4) of the supporting structure (2).

In a sixteenth aspect according to any one of the previous six aspects, the connecting mechanism (12) comprises at least one connecting bridge (15) placeable between the first end (9a, 10a) of the corresponding revolving roller (9, 10) and the corresponding striker plate (13).

In a seventh aspect according to the previous aspect, the connecting bridge (15) comprises an elongated plate (17) having a first end (17a) arranged to rotatively support the first end (9a, 10a) of the corresponding revolving roller (9, 10) and a second end (17b) opposite the first end (17a) provided with a folded plate (17c).

In an eighteenth aspect according to the previous aspect, the folded plate (17c) of the elongated plate (17) of the connecting bridge (15) has a trough opening (17d).

In a nineteenth aspect according to the previous aspect, the through opening (17d) of the folded plate (17c) of the elongated plate (17) of the connecting bridge (15) is threaded.

In a twentieth aspect according to any one of the previous three aspects, the folded plate (17c) of the elongated plate (17) of the connecting bridge (15) rests against the striker plate (13) when the corresponding revolving roller (9, 10) is positioned at the relative close position, whereas when the corresponding revolving roller (9, 10) is positioned at the relative distant position, the folded plate (17c) of the elongated plate (17) of the connecting bridge (15) is separated from the striker plate (13).

In a twenty-first aspect according to any one of the previous four aspects, the elongated plate (17) of the connecting bridge (15) comprises at least one locking seat (19), adapted to be engaged by a locking element, optionally a threaded bolt.

In a twenty-second aspect according to the previous aspect the locking seat (19) is interposed between the first end (17a) and the second end (17b) of the elongated plate (17).

In a twenty-third aspect according to any one of the previous two aspects the locking seat (19) is substantially located close to a middle point of the elongated plate (17).

In a twenty-fourth aspect according to any one of the previous three aspects, the locking seat (19) is substantially elliptical in shape.

In a twenty-fifth aspect according to any one of the previous four aspects, the locking element is engageable into a locking opening (14b) defined on the corresponding structural bar (14) of the curved top portion (4) of the supporting structure (2).

In twenty-sixth aspect according to the previous aspect, the locking opening (14b) of the structural bar (14) of the top portion (4) of the supporting structure (2) is threaded, optionally the locking element being screwable into the locking opening (14b).

In a twenty-seventh aspect according to the twenty-fifth aspect, the locking opening (14b) of the structural bar (14) of the top portion (4) of the supporting structure (2) is engageable by a nut element (27) having a central coupling seat (27a) adapted to be engaged by the locking element.

In a twenty-eighth aspect according to the previous aspect, the coupling seat (27a) of the nut element (27) is treaded, optionally the locking being threaded and being screwable into the central coupling seat (27a) of the nut element (27).

In a twenty-ninth aspect according to any one of the previous thirteen aspects, a guiding mechanism (20) is operatively interposed between the elongated plate (17) of the connecting bridge (15) and the corresponding structural bar (14) of the curved top portion (4) of the supporting structure (2) for guiding the connecting bridge (15) between the relative distant position and the relative close position of the corresponding revolving roller (9, 10).

In a thirtieth aspect according to the previous aspect, the guiding mechanism (20) comprises at least one guiding groove (21) developing according to a length sufficient to allow the corresponding revolving roller (9, 10) to move between the relative distant position and the relative close position.

In a thirty-first aspect according to the previous aspect, the guiding groove (21) is defined on the corresponding structural bar (14) of the curved top portion (4) of the supporting structure (2).

In a thirty-second aspect according to any one of the previous two aspects, the guiding mechanism (20) comprises at least one guiding plug (22) operatively engageable the guiding groove (21) to slide along this latter when the corresponding revolving roller (9, 10) is moved between the relative distant position and the relative close position.

In a thirty-third aspect according to the previous aspect, the guiding plug (22) of the guiding mechanism (20) develops from the elongated plate (17) of the connecting bridge (15).

In a thirty-fourth aspect according to any one of the previous two aspects, the guiding plug (22) of the guiding mechanism (20) is operatively interposed between the elongated plate (17) of the connecting bridge (15) and the corresponding structural bar (14) of the top portion (4) of the supporting structure (2).

In a thirty-fifth aspect according to any one of the previous three aspects, the guiding plug (22) of the guiding mechanism (20) engages a through opening (23) defined on the elongated plate (17) of the connecting bridge (15).

In a thirty-sixth aspect according to any one of the previous four aspects, the guiding plug (22) of the guiding mechanism (20) is inserted by interference into a through opening (23) defined on the elongated plate (17) of the connecting bridge (15).

In a thirty-seventh aspect according to any one of the previous two aspects, the through opening (23) for the guiding plug (22) of the guiding mechanism (20) is interposed between the locking seat (19) and a corresponding end (17a, 17b) of the elongated plate (17) of the connecting bridge (15).

In a thirty-eighth aspect according to any one of the previous twenty-one aspects, the connecting bridge (15) of the connecting mechanism (12) also comprises at least one supporting joint (18) fixable on the second end (17b) of the elongated plate (17).

In a thirty-ninth aspect according to the previous aspect, the supporting joint (18) of the connecting bridge (15) of the connecting mechanism (12) is provided with a through opening (18a) to rotatively be engaged by the first end (9a, 10a) of the corresponding revolving roller (9, 10).

In a fortieth aspect according to any one of the previous twenty-four aspects, the connecting mechanism (12) comprises at least one connecting and adjusting element (16) operatively interposable between the connecting bridge (15) and the striker plate (13) to determine the corresponding revolving roller (9, 10) to move between the relative distant position and the relative close position.

In a forty-first aspect according to the previous aspect, the connecting bridge (15) comprises an elongated plate (17) having a first end (17a) arranged to rotatively support the first end (9a, 10a) of the corresponding revolving roller (9, 10) and a second end (17b) opposite the first end (17a) provided with a folded plate (17c) having a trough opening (17d), the connecting and adjusting element (16) comprising an adjusting bolt (16a) engageable into the through opening (17d) of the folded plate (17c) of the elongated plate (17) of the connecting bridge (15).

In a forty-second aspect according to the previous aspect, the adjusting bolt (16a) has a thrust surface (16b) adapted to act against the striker plate (13) to move the elongated plate (17) and the connecting bridge (15) with respect to the corresponding structural bar (14) and move the corresponding revolving roller (9, 10) between the relative distant position and the relative close position.

In a forty-third aspect according to any one of the previous two aspects, the connecting and adjusting element (16) comprises a coupling nut (16c) aligned to the through opening (17d) of the folded plate (17c) of the elongated plate (17) of the connecting bridge (15) according to a position interposed between the folded plate (17c) and the corresponding revolving roller (9, 10).

In a forty-fourth aspect according to the previous aspect, the coupling nut (16c) is engageable by the adjusting bolt (16a) to interact with this latter to adjust the position of the corresponding revolving roller (9, 10) between the relative distant position and the relative close position.

In a forty-fifth aspect according to any one of the previous five aspects, the connecting and adjusting element (16) is drivable by an operator through the use of at least one manual tool.

In a forty-sixth aspect according to any one of the previous aspects, the curved top portion (4) comprises a plurality of structural rods (24a, 24b, 24c, 24d) configured to define a supporting assembly (25) open in correspondence of the arched narrow side (7) of the curved top portion (4).

In a forty-seventh aspect according to the previous aspect, the supporting assembly (25) is closed at the arched wide side (6) of the curved belt conveyor (4) by (e.g. vertical) elements (26) and said (e.g., bar) elements (26) preventing the endless conveyor belt from being extracted from the arched wide side.

In a forty-eighth aspect according to any one of the previous two aspects, the supporting assembly (25) of the curved top portion (4) of the supporting structure (2) is openable at the arched narrow side (7) by removing a protective case (28) removably engaged at the arched narrow side (7).

In a forty-ninth aspect according to the previous three aspects, the supporting assembly (25) of the curved top portion (4) of the supporting structure (2) is closable at the arched narrow side (7) by applying a removable protective case (28).

In a fiftieth aspect according to any one of the previous three aspects, the supporting assembly (25) of the curved top portion (4) of the supporting structure (2) comprises a first plurality of substantially radial structural rods (24a) and a second plurality of substantially radial structural rods (24c) placed below the first plurality of substantially radial structural rods (24a), in working conditions, the endless conveyor belt (8) having an upper portion placed above the first plurality of substantially radial structural rods (24a) and a lower portion placed between the first plurality of substantially radial structural rods (24a) and the second plurality of substantially radial structural rods (24c).

In a fifty-first aspect according to the previous aspect, each of the first plurality of substantially radial structural rods (24a) and each of the second plurality of substantially radial structural rods (24c) has a free end in correspondence of the arched narrow side (7) of the curved top portion, the free ends of the first plurality of substantially radial structural rods (24a) being not connected to the free ends the second plurality of substantially radial structural rods (24c) at the arched narrow side (7).

The first plurality of substantially radial structural rods (24a) and each of the second plurality of substantially radial structural rods (24c) defines an open end at the arched narrow side (7) allowing endless conveyor belt removal.

In a fifty-first bis aspect according to any one of the previous two aspects, each upper radial structural rod of the first plurality of substantially radial structural rods (24a) is connected through a connection element—e.g., bar element (26)—to a respective lower radial structural rod of the second plurality of substantially radial structural rods (24c) at the arched wide side (6), particularly forming a "C"-shaped or an "H"-shaped structure.

In a fifty-first ter aspect according to the previous aspect, the lower portion of the endless conveyor belt (8) is housed within a space defined by the upper radial structural rod, the lower radial structural rod, and the connection element.

In a fifty-first quater aspect according to the any one of the previous four aspects, the two revolving rollers (9, 10) lie substantially in the same plane of the first plurality of substantially radial structural rods (24a) and being located on a respective external lateral side of the first plurality of substantially radial structural rods (24a).

In a fifty-first quinquies aspect according to any one of the previous five aspects, the connecting mechanism (12) connects the at least one revolving roller (9, 10) that is movable to at least one upper radial structural rod of the first plurality of substantially radial structural rods (24a), in particular the connecting mechanism (12) connecting one end of the at least one revolving roller (9, 10) that is movable to one free end of the at least one upper radial structural rod in correspondence of the arched narrow side (7).

In a fifty-first sexies aspect according to any one of the previous three aspects, wherein the supporting assembly (25) of the curved top portion (4) of the supporting structure (2) comprises a first plurality of substantially radial structural rods (24a) interconnected with at least one corresponding structural transversal rod (24b); a second plurality of substantially radial structural rods (24c) interconnected with at least one corresponding structural transversal rod (24c).

In a fifty-second aspect according to the previous aspect, the structural rods (24a, 24b, 24c, 24d) of the first plurality and the second plurality of the supporting assembly (25) of the curved top portion (4) of the supporting structure (2) are overlaid.

In a fifty-third aspect according to any one of the previous two aspects, the endless conveyor belt (8) develops around the first plurality of radial structural rods (24a) and the revolving rollers (9, 10).

In a fifty-fourth aspect according to any one of the previous aspects, the curved top portion (4) of the supporting structure (2) is liftable with respect to the base (3).

In fifty-fifth aspect according to any one of the previous aspects, the arched narrow portion (7) of the curved top portion (4) of the supporting structure (2) is liftable with respect to the base (3).

In a fifty-sixth aspect according to any one of the previous aspects, the curved top portion (4) of the supporting structure (2) is swiveling engaged to the base (3).

In a fifty-seventh aspect according to any one of the previous aspects, the curved top portion (4) of the supporting structure (2) is pivotable between a working position, wherein the endless conveyor belt (8) is substantially horizontal or oriented so that to allow an object and/or an article to advance along the curved advancing path (P) of the curved top portion (4) and a maintenance position, wherein the arched narrow side (7) is raised with respect to the base (3) and the arched wide side (6) is turned towards the floor (F).

In an additional fifty-eighth aspect, independent of the other previous aspects, a method of disengaging an endless conveyor belt (8) from a curved belt conveyor (1) comprises the following steps:

moving at least one revolving roller (9, 10) with respect to the other revolving roller (9, 10) from a relative distant position, wherein the endless conveyor belt (8) is kept under tension, being not removable from the revolving rollers (9, 10) to a close relative close position, wherein the conveyor belt (8) is loosen, being removable from the revolving rollers (9, 10), optionally through an arched narrow side (7) of a curved top portion (4) of a supporting structure (2) of the curved belt conveyor (1);

removing the endless conveyor belt (8) from the revolving rollers (9, 10) when at least one of the revolving rollers (9, 10) is positioned at the relative close position.

In fifty-ninth aspect according to previous aspect, independent of the other previous aspects, the step of moving at least one revolving roller (9, 10) is effected by moving both revolving rollers (9, 10) from the relative distant position to the relative close position.

In a sixtieth aspect according to the any one of the previous two aspects, the movement of each revolving roller (9, 10) from the relative distant position to the relative close position determines the formation of at least one corresponding space (S) between the endless conveyor belt (8) and the corresponding revolving roller (9, 10), the space (S) allowing the endless conveyor belt (8) to be removed from the revolving rollers (9, 10).

In a sixty-first aspect according to any one of the previous three aspects, the step of moving each revolving roller (9, 10) from the relative distant position to the relative close position is performed performing the following step of switching a corresponding connecting mechanism (12) operatively interposed between the corresponding revolving roller (9, 10) and the corresponding arched narrow side (6, 7) of the curved top portion (4) of the supporting structure (2) of the curved belt conveyor (1) from a locking condition, wherein the corresponding revolving roller (9, 10) cannot move with respect to the other revolving roller 9, 10) to an unlocking condition wherein the corresponding revolving roller (9, 10) is movable from the relative distant position to the relative close position.

In a sixty-second aspect according to the previous aspect, the step of switching the corresponding connecting mechanism (12) from the locking condition to the unlocking condition is performed unlocking a connecting bridge (15) of the corresponding connecting mechanism (12), optionally the unlocked connecting bridge (15) being movable along the arched narrow side (7) of the curved top portion (4) of the supporting structure (2) of the curved belt conveyor (1).

In a sixty-third aspect according to the previous aspect, when the connecting bridge (15) of the corresponding connecting mechanism (12) is at the unlocked condition, the method comprises the step of driving a corresponding adjusting bolt (16a) of a corresponding connecting and adjusting element (16), operatively interposed between the corresponding bridge (15) and a corresponding striker plate (13) engaged to a structure bar (14) of the curved top portion (4) of the supporting structure (2) of the curved conveyor belt (1), to determine the corresponding revolving roller (9, 10) to move between the relative distant position and the relative close position.

In a sixty-fourth aspect according to the previous aspect, the step of driving the corresponding adjusting bolt (16a) of the corresponding and adjusting element (16) determines a cooperation between the adjusting bolt (16a) and the striker plate (13) which provides the corresponding connecting bridge (15), and therefore the corresponding revolving roller (9, 10) to move from the relative distant position to the relative close position.

In a sixty-fifth aspect according to the previous aspect, the step of moving the corresponding revolving roller (9, 10) from the relative distant position to the relative close position is performed until a folded plate a (17c) of a corresponding elongated plate (17) of the corresponding connecting bridge (15) of the corresponding connecting mechanism (12) stands against the corresponding striker plate (13), optionally the size of the corresponding space S between the endless conveyor belt (8) and the corresponding revolving roller (9, 10) is at the maximum value.

In a sixty-sixth aspect according to any one of the previous aspects, the method also comprises the step releasing a thickening element (8b) of the endless conveyor belt (8) from gripping rollers (la) of the top portion (4) of the supporting structure (2) of the curved belt conveyor (1) to allow the endless belt conveyor (8) be removable from the corresponding revolving rollers (9, 10).

In a sixty-seventh aspect according to the previous aspect, the step of releasing the thickening element (8b) of the endless conveyor belt (8) is performed before the step of moving at least one revolving roller (9, 10) from the relative distant position to the relative close position.

In a sixty-eighth aspect according to the sixty-sixth aspect the step of releasing the thickening element (8b) of the endless conveyor belt (8) is performed after the step of moving at least one revolving roller (9, 10) from the relative distant position to the relative close position.

In a sixty-ninth aspect according to any one of the previous eleven aspects, the method also comprises a step of pivoting the curved top portion (3) with respect to a base (3) of the supporting structure (2).

In a seventieth aspect according to any one of the previous twelve aspects, the method comprises a step of lifting the arched narrow side (7) of the curved top portion (4) of the supporting structure (2) of the curved belt conveyor (1) at a height higher than the height of working.

In a seventy-first aspect according to any one of the previous thirteen aspects, the method comprises a step of tilting the curved top portion (4) so that to raise the arched narrow side (7) and lowering the arched wide side (6), optionally to be turned towards the floor (F).

In an additional seventy-second aspect, the method of disengaging the endless conveyor belt (8) from the curved belt conveyor according to any one of the previous fourteen aspects is dependent on any one of the other previous aspects from the first to the fifty-seventh.

DETAILED DESCRIPTION

Considering the embodiments shown in FIGS. 1 to 4 and 6, the invention refers to a curved belt conveyor 1 designed to transport, in a continuous operation, objects, packages, boxes, luggage, baggage, suitcases and similar, articles and solid materials along a curved advancing path P.

Figure 1:
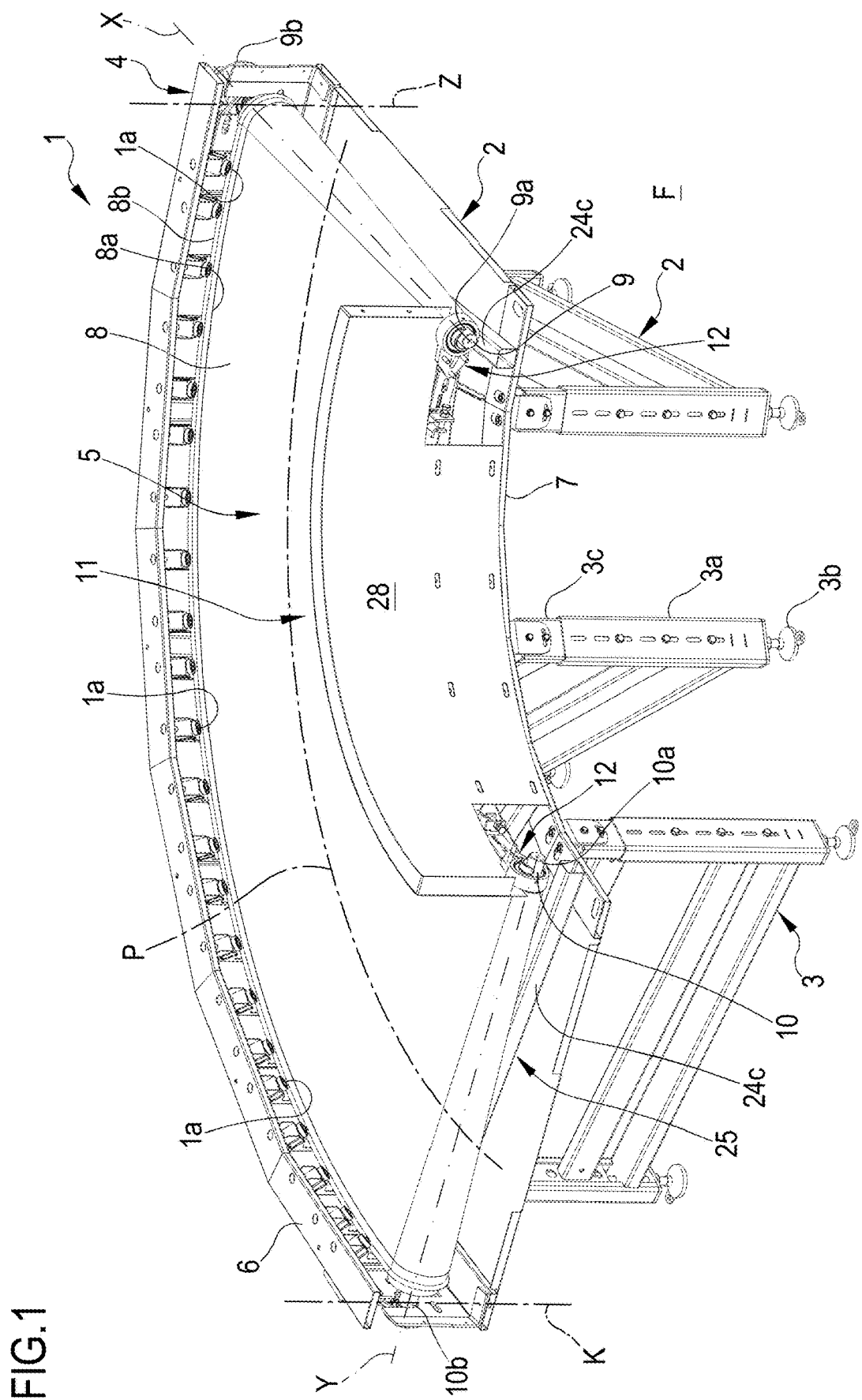
FIG. 1 is a perspective view of a curved belt conveyor according to a first embodiment of the present invention.
Figure 6:
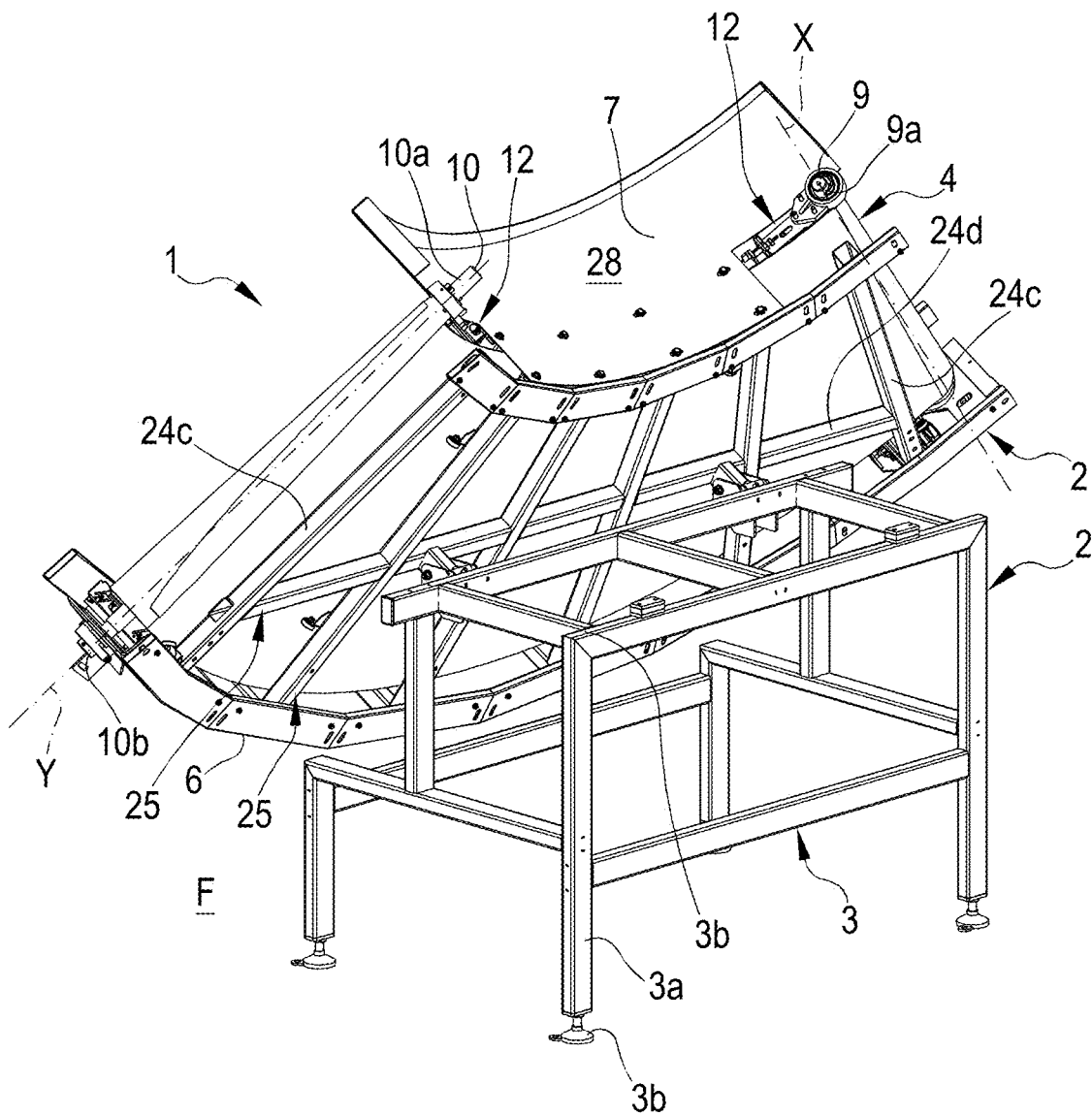
FIG. 6 is a perspective view of a curved belt conveyor according to a second embodiment of the present invention, with the curved top portion shown in FIGS. 2 to 5 inclined with respect to a corresponding base.

As it can be seen in FIGS. 1 and 6, the curved belt conveyor 1 comprises a supporting structure 2 having a base 3 for supporting the curved belt conveyor 1 on a floor F. The base 3 comprises a plurality of supporting legs 3a each having a supporting foot 3b which lays on the floor F and an upper end 3c engaged a curved top portion 4 of the supporting structure 2.

The curved top portion 4 defines at least one curved advancing plane 5 (FIGS. 1 to 4) for one or more objects and/or articles to be moved along the curvilinear advancing path P. The curved top portion 4 is provided with an arched wide side 6 and an arched narrow side 7 opposite each other.

The curved belt conveyor 1 is provided with at least one endless conveyor belt 8 operatively engaged to the curved top portion 4 of the supporting structure 2 to define the curved advancing plane 5 of the curved top portion 4.

The endless conveyor belt 8 develops at least partially around at least two revolving rollers 9, 10, rotationally engaged to the curved top portion 4 of the supporting structure 2. In particular, each revolving roller 9, 10 is rotationally supported between the arched wide side 6 and the arched narrow side 7 of the curved top portion 4 of the supporting structure 2.

At least one of the revolving roller 9 is motorized, but both revolving rollers 9, 10 can be motorized depending of the needs. Whether only one revolving roller 9 is motorized, the other revolving roller 10 is driven in rotation by the rotation of the motorized revolving roller 9, being therefore an idle roller.

The endless conveyor belt 8 is gripped on the revolving rollers 9, 10 so that when the motorized revolving roller 9 is rotationally activated, the endless conveyor belt 8 moves according to a closed ring configuration rotationally dragging the idle revolving roller 10.

Advantageously, at least one revolving roller 9, 10 is movable with respect to the other between a relative distant position (FIGS. 1, 2, 4 and 6) wherein the endless conveyor belt 8 is kept under tension in order to ensure a stable gripping force between this latter and the revolving rollers 9, 10 whereby any removable operation of the endless conveyor belt 8 cannot be performed, and a relative close position (FIG. 3) wherein the endless conveyor belt 8 is loosen being easily removable from the revolving rollers 9, 10, optionally through the arched narrow side 7 of the curved top portion 4 of the supporting structure 2.

Preferably, each revolving roller 9, 10 is movable with respect to the other between a relative distant position wherein the endless conveyor belt 8 is maintained in tension between the revolving rollers 9, 10, being not removable from these latter, and a relative close position, wherein the endless conveyor belt 8 is loosen, being removable from such revolving rollers 9, 10, optionally through the arched narrow side 7 of the curved top portion 4 of the supporting structure 2.

In order to allow each revolving roller 9, 10 be movable between the relative distant position and the relative close position, a first end 9a, 10a of each revolving roller 9, 10 is movable along a corresponding arched side 7 towards a middle portion 11 of the curved top portion 4 of the supporting structure 2 from the relative distant position to the relative close position and is movable along the corresponding arched side 7 towards the opposite direction from the relative close position to the relative distant position.

The first end 9a, 10a of each revolving roller 9, 10 faces he arched narrow side 7 of the curved top portion 4 of the supporting structure 2 whereby it is movable along the arched narrow side 7 between the relative distant position and the relative close position.

Each revolving roller 9, 10 has a second end 9b, 10b opposite the corresponding first end 9a, 10a, operatively engaged to the arched wide side 6 of the curved top portion 4 of the supporting structure 2 to allow the corresponding first end 9a, 10a to be moved between the relative distant position and the relative close position.

In particular, it has to be noted that each revolving roller 9, 10 is movable between the relative distant position, wherein a corresponding longitudinal axis X, Y is substantially perpendicular to at least one of the arched sides 6, 7 of the curved top portion 4 of the supporting structure 2 and the relative close position wherein the corresponding longitudinal axis X, Y is inclined with respect to at least one of the arched sides 6, 7 of the curved top portion 4 of the supporting structure 2.

In other words, each revolving roller 9, 10 is pivotable between the relative distant position and the relative close position around a corresponding pivoting axis Z, K developing through the arched wide side 6, transversally to, preferably perpendicularly to, the corresponding longitudinal axis X, Y and the curved advancing plane 5 of the curved top portion 4 of the supporting structure 2 whereby both movements from the relative distant position to the relative close position and vice-versa draw a corresponding rotation of the corresponding revolving roller 9, 10 hinged in the arched wide side 7 of the curved top portion 4 of the supporting structure 2.

Figure 3:
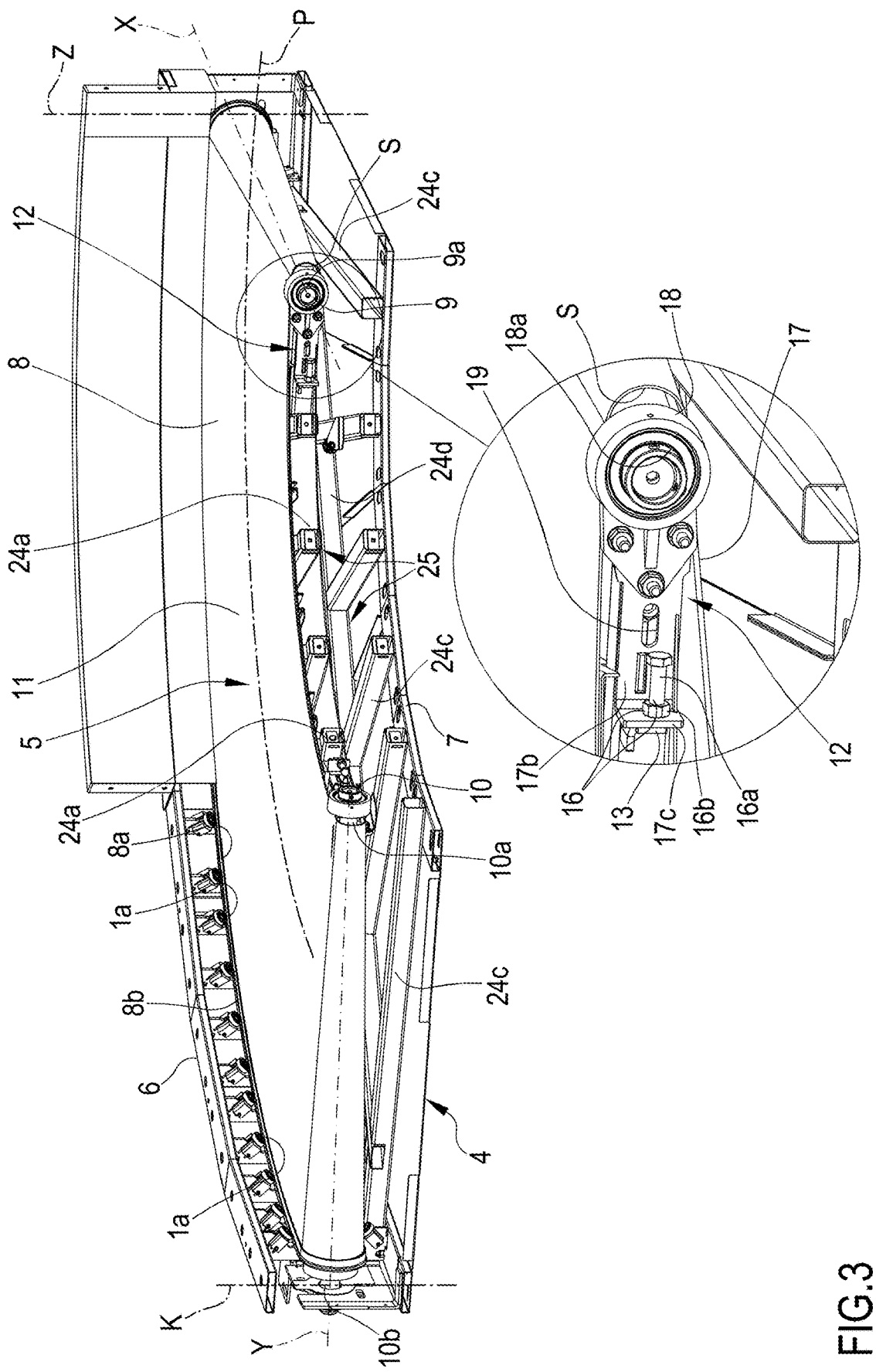
FIG. 3 is a second perspective view of the curved top portion shown in FIG. 2 of the curved belt conveyor shown in FIG. 1, with the revolving rollers shown in a close distant position and with one detail highlighted by an enlargement.

As can be seen in FIG. 3 and, in particular by the enlargement of FIG. 3, when at least one revolving roller 9, 10 is positioned in the relative close position, a space S between any revolving roller 9, 10 and the endless conveyor belt 8 forms. The presence of the space S, due to the relative close position of the revolving rollers 9, 10, allows the endless conveyor belt 8 to be easily and quickly removed from the revolving rollers 9, 10, as well as ensures that a new endless conveyor belt 8 be easily and quickly fitted over the revolving rollers 9, 10.

Advantageously, at least one connecting mechanism 12 is operatively interposed between each revolving roller 9, 10 and a corresponding arched side 6, 7 of the curved top portion 4 of the supporting structure 2.

The connecting mechanism 12 is switchable between a locking condition wherein the corresponding revolving roller 9, 10 is maintained in a fixed position, particularly the relative distant position, and an unlocking condition, wherein the corresponding revolving roller 9, 10 can be moved between the relative distant position and the relative close position.

As shown in FIGS. 1 to 4 and 6, the connecting mechanism 12 is operatively interposed between a first end 9a, 10a of a corresponding revolving roller 9, 10 and the arched narrow side 7 of the curved top portion 4 of the supporting structure 2.

Figure 5:
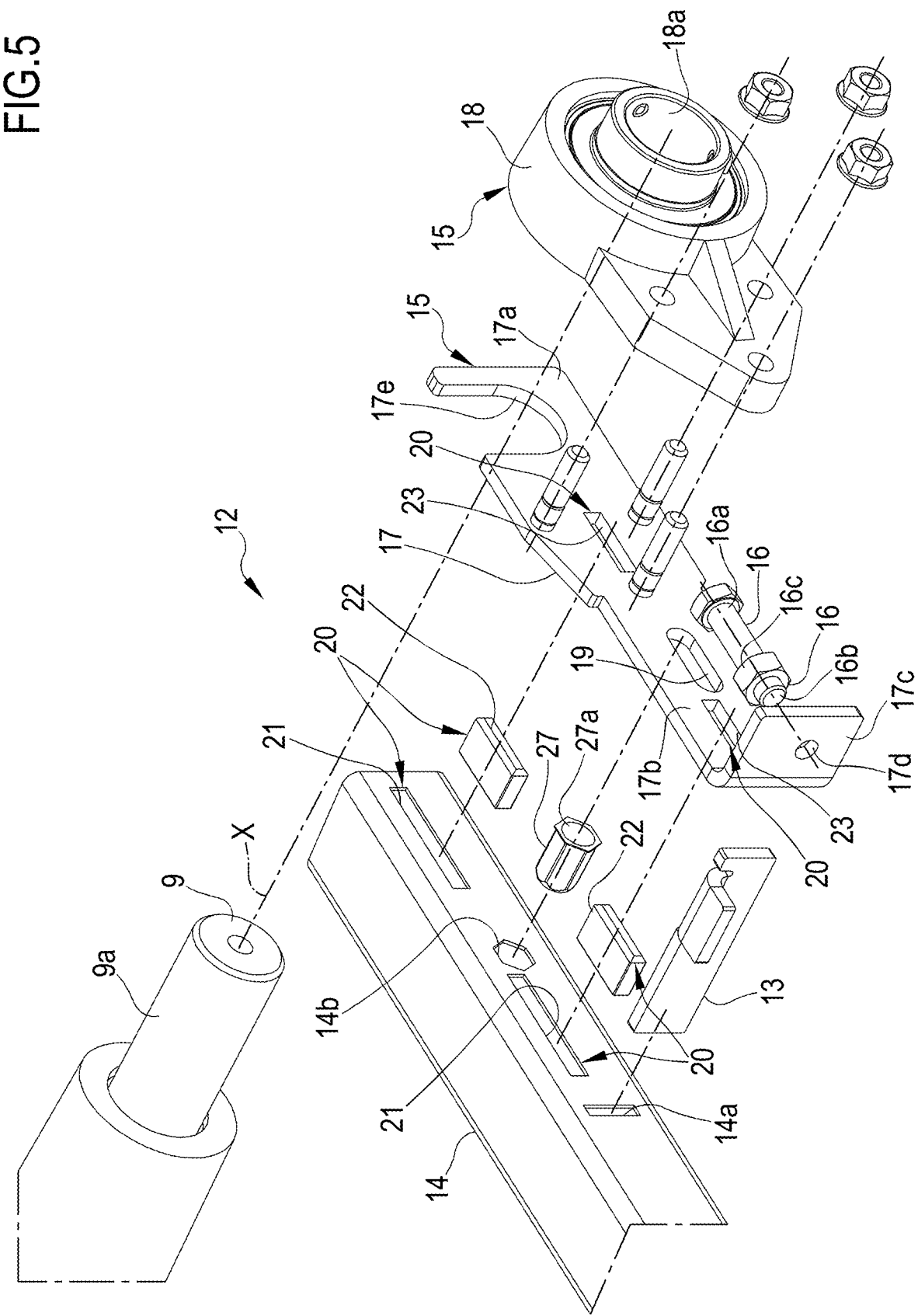
FIG. 5 is an exploded axonometric view of a detail of the curved top portion shown in FIGS. 2 to 4 of the curved belt conveyor shown FIG. 1.

In particular, as clearly viewable in FIG. 5 the connecting mechanism 12 comprises at least one striker plate 13 engageable to a structural bar 14 of the curved top portion 4 of the supporting structure 2. The striker plate 13 develops from such a structural bar 14 in correspondence of the arched narrow side 7 of the curved top portion 4.

The striker plate 13 of the corresponding connecting mechanism 12 is inserted into a corresponding seat 14a, preferably a through opening, made in the corresponding structural bar 14 of the curved top portion 4 of the supporting structure 2.

The connecting mechanism 12 also comprises at least one connecting bridge 15 placeable between the first end 9a, 10a of the corresponding revolving roller 9, 10 and the corresponding striker plate 13 and at least one connecting and adjusting element 16 operatively interposable between the connecting bridge 15 and the striker plate 13 to determine the corresponding revolving roller 9, 10 to move between the relative distant position and the relative close position.

The connecting bridge 15 comprises an elongated plate 17 having a first end 17a provided with a rotation cradle 17e arranged to rotatively support the first end 9a, 10a of the corresponding revolving roller 9, 10 and a second end 17b opposite the first end 17a, provided with a folded plate 17c having a through opening 17d.

Optionally, the through opening 17d of the folded plate 17c of the second end 17b of the elongated plate 17 can be threaded to allow a corresponding threaded element to be screwable into the through opening 17d.

Preferably, the folded plate 17c of the elongated plate 17 rests against the striker plate 13 when the corresponding revolving roller 9, 10 is positioned at the relative close position (FIG. 3), whereas when the corresponding revolving roller 9, 10 is positioned at the relative distant position (FIGS. 1, 2, 4 and 6) the folded plate 17c of the elongated plate 17 is separated from the striker plate 13.

The connecting bridge 15 comprises at least one supporting joint 18 fixable on the second end 17b of the elongated plate 17 of the connecting bridge 15 and provided with a through opening 18a to rotatively be engaged by the first end 9a, 10a of the corresponding revolving roller 9, 10.

The through opening 18a of the supporting joint 18 is aligned to the rotation cradle 17e of the first end 17a of the elongated plate 17 of the connecting bridge 15 in order to accommodate the first end 9a, 10a of the corresponding revolving roller 9, 10.

Preferably, the elongated plate 17 of the connecting bridge 15 comprises at least one locking seat 19, particularly substantially elliptical in shape, adapted to be engaged by a locking element (not shown in the attached figures), optionally a threaded bolt, engageable into a locking opening 14b defined on the corresponding structural bar 14 of the curved top portion 4 of the supporting structure 2.

According to an embodiment not shown in the attached figures, the locking opening 14b of the structural bar 14 can be circular and threaded, so that to interact with a threaded locking element, also not shown in the attached figures.

According to the embodiment shown in FIG. 5, the locking opening 14b is hexagonal and unthreaded.

The locking opening 14b is engageable by a nut element 27 having a central coupling seat 27a, optionally threaded, adapted to be engaged by a locking element (not shown in the attached figures), also optionally threaded. The locking seat 19 is interposed between the first end 17a and the second end 17b of the elongated plate 17. In particular, the locking seat 19 is substantially located close to a middle point of the elongated plate 17.

As shown in FIG. 5, a guiding mechanism 20 is operatively interposed between the elongated plate 17 of the connecting bridge 15 and the corresponding structural bar 14 of the curved top portion 4 of the supporting structure 2 for guiding the connecting bridge 15 between the relative distant position and the relative close position of the corresponding revolving roller 9, 10.

The guiding mechanism 20 comprises at least one guiding groove 21, developing according to a length sufficient to allow the corresponding revolving roller 9, 10 to move between the relative distant position and the relative close position and at least one guiding plug 22 operatively engageable the guiding groove 21 to slide along this latter when the corresponding revolving roller 9, 10 is moved between the relative distant position and the relative close position.

In particular, the guiding mechanism 20 comprises two guiding grooves 21, each developing according to a length sufficient to allow the corresponding revolving roller 9, 10 to move between the relative distant position and the relative close position and two corresponding guiding plugs 22 each operatively engageable the corresponding guiding groove 21 to slide along this latter when the corresponding revolving roller 9, 10 is moved between the relative distant position and the relative close position.

Preferably, the guiding grooves 21 are aligned each other along a common direction developing substantially parallel to the corresponding structural bar 14 of the curved top portion 4 of the supporting structure 2.

Each guiding groove 21 is defined on the corresponding structural bar 14 of the curved top portion 4 of the supporting structure 2, whereas each guiding plug 22 develops from the elongated plate 17 of the connecting bridge 15. Each guiding plug 22 engages a corresponding through opening 23 defined at the elongated plate 17 of the connecting bridge 15. In particular, each guiding plug 22 is inserted, preferably by interference, into a corresponding through opening 23 defined at the elongated plate 17 of the connecting bridge 15.

Each through opening 23 defined at the elongated plate 17 for the corresponding guiding plug 22 is interposed between the locking seat 19 and a corresponding end 17a, 17b of the elongated plate 17 of the connecting bridge 15. Preferably, the locking opening of the elongated plate 17 is interposed between the through openings 23 for the corresponding guiding plugs 22.

The connecting and adjusting element 16 comprises an adjusting bolt 16a engageable into the through opening 17d of the folded plate 17c of the elongated plate 17 of the connecting bridge 15. The adjusting bolt 16a has a thrust surface 16b adapted to act against the striker plate 13 to move the elongated plate 17 and the connecting bridge 15 with respect to the corresponding structural bar 14 and move the corresponding revolving roller 9, 10 between the relative distant position and the relative close position.

The connecting and adjusting element 16 also comprises a coupling nut 16c aligned to the through opening 17d of the folded plate 17c of the elongated plate 17 of the connecting bridge 15 according to a position interposed between the folded plate 17c and the corresponding revolving roller 9, 10. The coupling nut 16c is engageable by the adjusting bolt 16a to interact with this latter to adjust the position of the corresponding revolving roller 9, 10 between the relative distant position and the relative close position.

Preferably, the connecting and adjusting element 16 is drivable by an operator through the use of at least one manual tool whereby the corresponding revolving roller 9, 10 can be manually moved between the relative distant position and the relative close position.

As shown in FIGS. 1 to 3 and 6, the endless conveyor belt 8 comprises an outer periphery 8a which, in operation, develops along the arched wide side 6 of the curved top portion 4 of the supporting structure 2 of the curved belt conveyor 1.

At least one thickening element 8b is associated with the outer periphery 8a of the endless conveyor belt 8 for laterally tensioning the endless conveyor belt 8 and avoiding this latter to slide towards the arched narrow side 7 of the curved top portion 4 of the supporting structure 2 of the curved conveyor belt 1.

The curved belt conveyor 1 comprises a plurality of gripping rollers 1a engageable to the thickening element 8b for guiding the endless conveyor belt 8 during its advancing movement along the curved advancing path P between the revolving rollers 9, 10, maintaining the endless conveyor belt 8 sufficiently taut to ensure the objects and/or articles to advance along the advancing path P.

The gripping rollers 1a are placed in correspondence of the arched wide side 6 of the curved top portion 4 of the supporting structure 2 of the curved conveyor belt 1 at two different levels so that to support both an upper carry side run of the conveyor belt and a lower return run of this latter.

The gripping rollers 1a are configured to retain the thickening element 8b of the endless conveyor belt 8 during the working operations of the curved belt conveyor 1 and release the thickening element 8b of the endless conveyor belt 8 for performing any maintenance operation of this latter.

Figure 4:
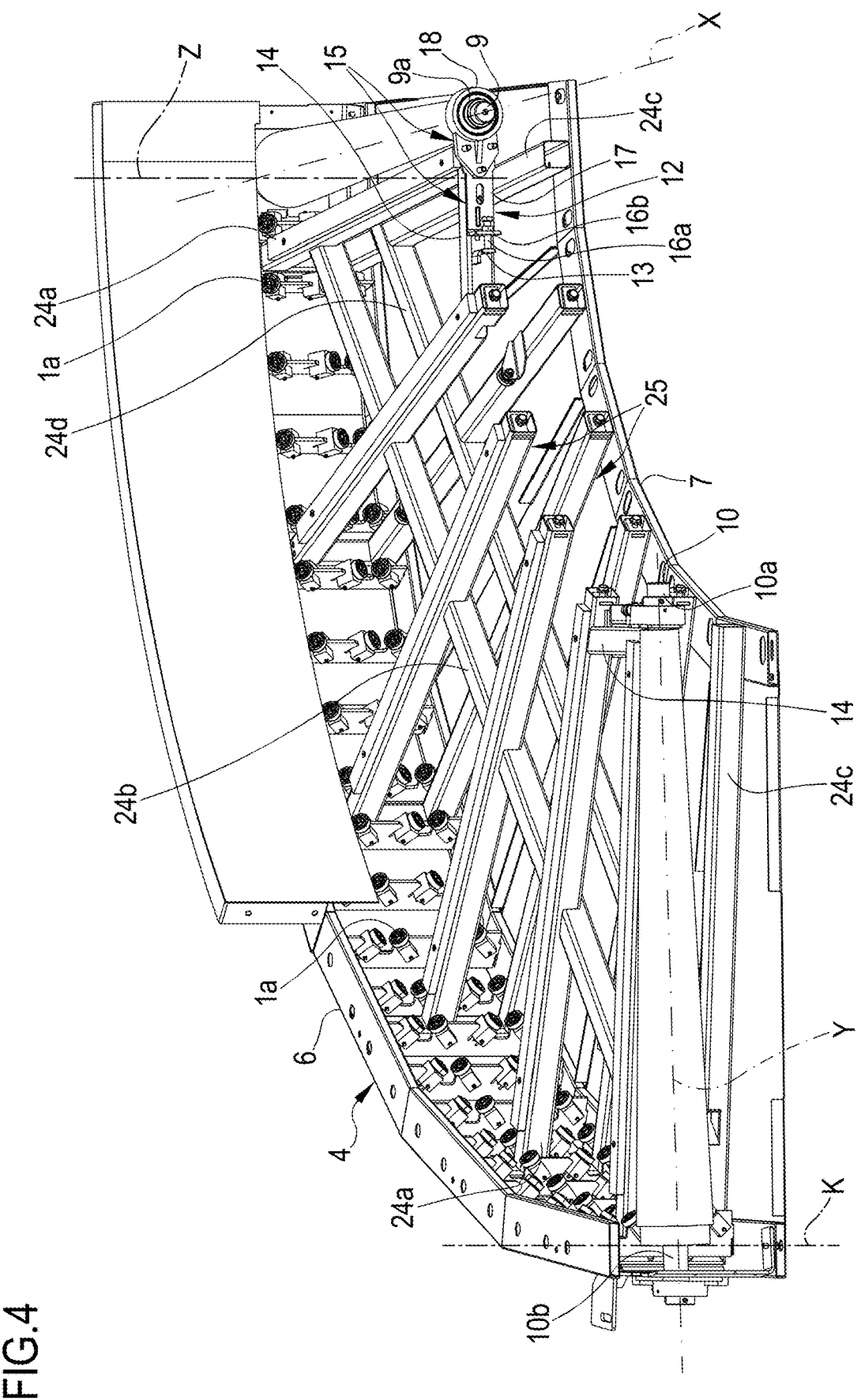
FIG. 4 is a third perspective view of the curved top portion shown in FIGS. 2 and 3 of the curved belt conveyor shown in FIG. 1, with some elements and parts hidden to allow other elements and parts to be viewable.

With reference to FIG. 4, the curved top portion 4 comprises a plurality of structural rods 24a, 24b, 24c, 24d configured to define a supporting assembly 25 open in correspondence of the arched narrow side 7 of the curved top portion 4. In particular, the supporting assembly 25 comprises a first plurality of radial structural rods 24a interconnected with at least one corresponding structural transversal rod 24b and a second plurality of radial structural rods 24c interconnected with at least one corresponding structural transversal rod 24c. The structural rods 24a, 24b, 24c, 24d of the first plurality and the second plurality are overlaid.

As shown in FIGS. 2 to 5 and 7, the supporting assembly 25 is closed at the arched wide side 6 of the curved belt conveyor 4 by vertical elements 26.

In particular, the vertical elements that close the arched wide side 6 of the supporting assembly 25 support the gripping rollers 1a adapted to kept the thickening element 8b of the endless conveyor belt 8.

At the opposite side, namely the arched narrow side 7 of the curved top portion 4 of the supporting structure 2, the supporting assembly 25 is openable by removing a protective case 27 which close such side to protect any operator from coming into contact with the moving parts.

Figure 2:
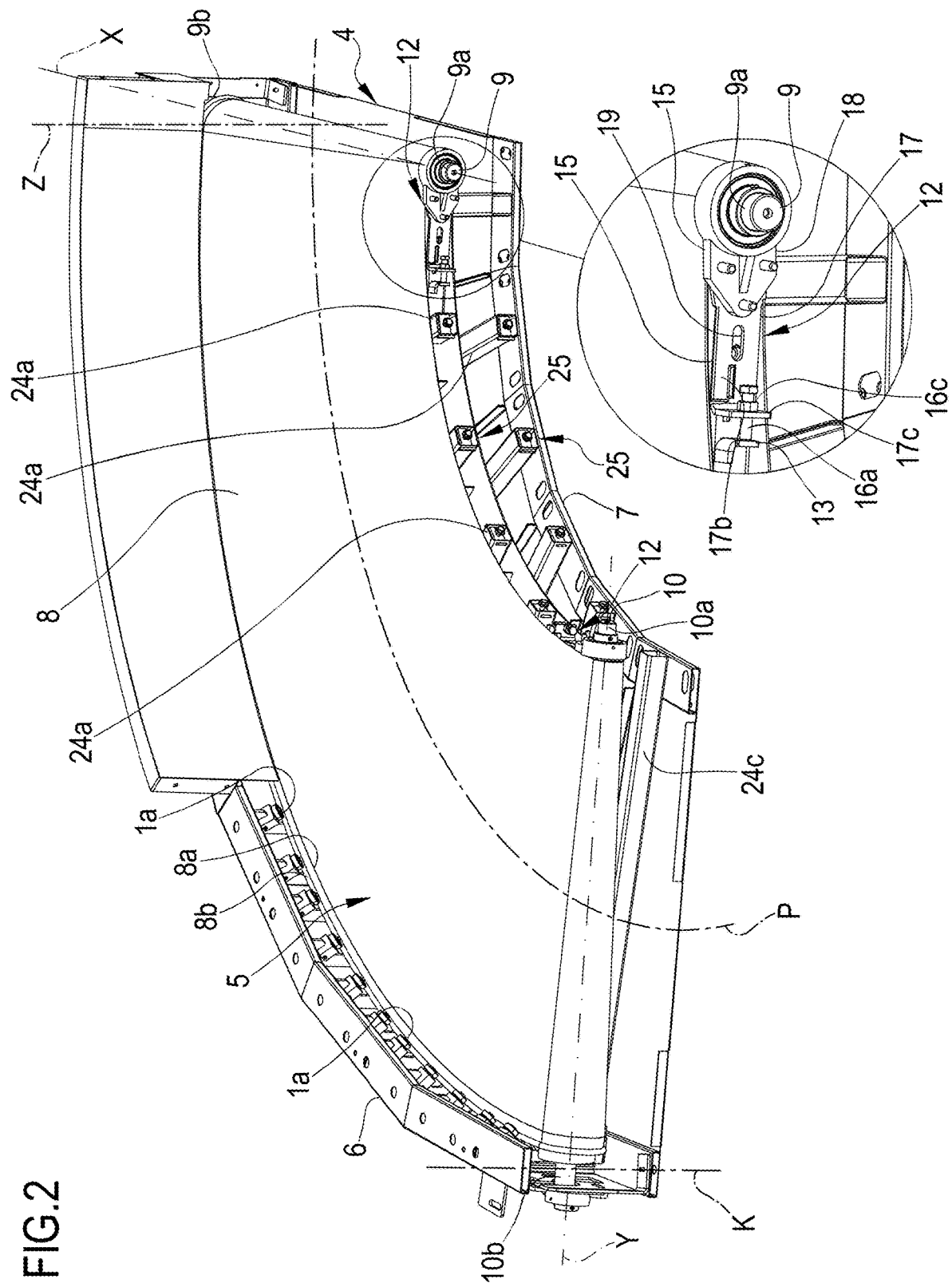
FIG. 2 is a first perspective view of a curved top portion of the curved belt conveyor shown in FIG. 1 with revolving rollers of a conveyor belt shown in a relative distant position and with one detail highlighted by an enlargement.

Considering the FIGS. 2, 3 and 6, the endless conveyor belt 8 develops around the first plurality of radial structural rods 24a and around the revolving rollers 9, 10, whereby when this latter are in the relative distant position the endless conveyor belt 8 can be removed from the rollers 9, 10 by also pulling it from the corresponding first plurality of radial structural rods 24a.

As shown in FIG. 6, the curved top portion 4 of the supporting structure 2 is liftable with respect to the base 3. In particular, the arched narrow portion 7 of the curved top portion 4 of the supporting structure 2 is liftable with respect to the base 3.

Advantageously, the supporting structure 2 is swiveling engaged to the base 3.

According to a preferred embodiment of the present invention, the curved top portion 4 is pivotable between a working position (FIGS. 1 to 4), wherein the endless conveyor belt 8 is substantially horizontal or oriented so that to allow an object or an article to advance along the curved advancing path P of the curved top portion 4 of the supporting structure 2 and a maintenance position (FIG. 6) wherein the arched narrow side 7 is raised with respect to the base 3 and the arched wide side 6 is turned towards the floor F.

According to the embodiments disclosed, when an operator needs to remove the endless conveyor belt 8 from the revolving rollers 9, 10, the thickening element 8b of the endless conveyor belt 8 is released from the gripping rollers 1a in order to transversally loosen this latter.

Successively, at least one revolving roller 9, 10 has to be moved from the relative distant position to the relative close position in order to loosen the endless conveyor belt 8 also between the revolving rollers 9, 10.

Preferably, both revolving rollers 9, 10 are moved from the relative distant position to the relative close position to provide a significant belt loosening by defining corresponding spaces S between the endless conveyor belt 8 and the corresponding revolving rollers 9, 10.

In order to move each revolving roller 9, 10 from the relative distant position to the relative close position the operator must intervene on the corresponding connecting mechanism 12 by unlocking the connecting bridge 15 thereof allowing the connecting bridge to move along the arched narrow side 7 of the curved top portion 4 of the supporting structure 2.

Once the connecting bridge 15 is unlocked, the operator can manually drive the corresponding adjusting bolt 16a of the corresponding connecting and adjusting element 16 to provide a cooperation between this latter and striker plate 13 that determines the corresponding connecting bridge 15 along with the corresponding revolving roller 9, 10 to move from the relative distant position to the relative close position.

As can be seen in FIG. 3, the movement of each revolving roller 9, 10 from the relative distant position to the relative close position can be performed until the folded plate 17c of the corresponding elongated plate 17 of the corresponding connecting bridge 15 stands against the striker plate 13. In this position, the size of the space S between the endless conveyor belt 8 and the corresponding revolving roller 9, 10 is at the maximum value.

In that situation, the endless conveyor belt 8 can be taken out from the curved top portion 4 of the supporting structure 2 by pulling it from the revolving rollers 9, 10. The endless conveyor belt is thus removed from the first plurality of structural rods 24a, 24b of the supporting assembly 35 of the curved top portion 4 of the supporting structure 2.

Advantageously, in order to make the removing operation more comfortable, it is possible to tilt the curved top portion 4 of the supporting structure 2 pivoting this latter with respect to the base 3. In particular, the arched narrow side 7 of the curved top portion 4 of the supporting structure 2 is lifted at a height comfortable for the operator. As a result the arched wide side 6 of the curved top portion 4 is turned towards the floor F. When a new endless conveyor belt 8 is mounted, it is fitted over the revolving rollers 9, 10 and the first plurality of structural rods 24a, 24b.

Successively, the thickening element 8b of the outer periphery 8a of the endless conveyor belt 8 is hooked to the gripping rollers 1a and the corresponding connecting bridges 15 of the corresponding connecting mechanisms 12 are moved, by driving the corresponding connecting and adjusting elements 16, from the relative close position and the relative distant position where the endless conveyor belt 8 is taut.

The invention claimed is:

1. A curved belt conveyor comprising:
    a supporting structure having a base for supporting the curved belt conveyor on a floor and a curved top portion engaged to the base, the curved top portion defining at least one curved advancing plane for one or more objects and/or articles to be moved along a curvilinear advancing path and being provided with an arched wide side and an arched narrow side opposite each other; and
    an endless conveyor belt operatively engaged to the curved top portion of the supporting structure to define the curved advancing plane of the curved top portion, the endless conveyor belt moving at least partially around at least two revolving rollers rotatively engaged to the curved top portion of the supporting structure;
    wherein at least one revolving roller of the at least two revolving rollers is movable with respect to the other roller of the at least two revolving rollers between a relatively distant position, wherein the endless conveyor belt is kept under tension and is not removable from the at least two revolving rollers, and a relatively close position, wherein the endless conveyor belt is loose and removable from the at least two revolving rollers, through the arched narrow side of the curved top portion of the supporting structure;
    wherein at least one connection mechanism is operatively interposed between the at least one revolving roller of the at least two revolving rollers that is movable and a corresponding arched side of the curved top portion of the supporting structure, the connection mechanism being switchable between a locking condition wherein the at least one corresponding revolving roller is maintained in the relatively distant position, and an unlocking condition, wherein the at least one revolving roller can be moved between the relatively distant position and the relatively close position.

2. The curved belt conveyor according to claim 1, wherein each of the at least two revolving rollers is movable with respect to the other of the at least two revolving rollers between a relative distant position wherein the endless conveyor belt is kept under tension and is not removable from the at least two revolving rollers, and a relative close position wherein the endless conveyor belt is loose and removable from the at least two revolving rollers.

3. The curved belt conveyor according to claim 2, wherein a first end of each of the at least two revolving rollers is movable along a respective arched side of the curved top portion of the supporting structure towards a middle portion of the curved top portion of the supporting structure from the relatively distant position to the relatively close position and is movable along the respective arched side towards the opposite direction from the relatively close position to the relatively distant position.

4. The curved belt conveyor according to claim 3, wherein the first end of each of the at least two revolving rollers faces the arched narrow side of the curved top portion of the supporting structure and is movable along the arched narrow side between the relatively distant position and the relatively close position.

5. The curved belt conveyor according to claim 4, wherein each of the at least two revolving rollers has a second end opposite to the first end, the second end being operatively engaged to the arched wide side of the curved top portion of the supporting structure to allow the first end to be moved between the relatively distant position and the relatively close position.

6. The curved belt conveyor according to claim 1, wherein each of the at least two revolving rollers is movable between the relatively distant position, wherein a corresponding longitudinal axis is substantially perpendicular to at least one of the arched sides of the curved top portion of the supporting structure and the relatively close position wherein the corresponding longitudinal axis is inclined with respect to at least one of the arched sides of the curved top portion of the supporting structure.

7. The curved belt conveyor according to claim 1, wherein the connection mechanism is operatively interposed between a first end of the at least one revolving roller and the arched narrow side of the curved top portion of the supporting structure.

8. The curved belt conveyor according to claim 7, wherein the connection mechanism comprises:
    at least one striker plate engageable to a structural bar of the curved top portion of the supporting structure;
    at least one connecting bridge placeable between the first end of the at least one revolving roller and the at least one striker plate; and
    at least one connecting and adjusting element operatively interposable between the at least one connecting bridge and the at least one striker plate to allow the at least one revolving roller to move between the relatively distant position and the relatively close position.

9. The curved belt conveyor according to claim 8, wherein the at least one connecting bridge comprises:
    an elongated plate having a first end arranged to rotatively support the first end of the at least one revolving roller and a second end opposite the first end provided with a folded plate having a through threaded opening, the folded plate of the elongated plate resting against the striker plate when the at least one revolving roller is positioned at the relatively close position, whereas when the at least one revolving roller is positioned at the relatively distant position the folded plate of the elongated plate is separated from the striker plate; and at least one supporting joint fixable on the second end of the elongated plate of the at least one connecting bridge and provided with a through opening to rotatively be engaged by the first end of the at least one revolving roller.

10. The curved belt conveyor according to claim 9, wherein at least one guiding mechanism is operatively interposed between the elongated plate of the at least one connecting bridge and the structural bar of the curved top portion of the supporting structure for guiding the at least one connecting bridge between the relatively distant position and the relatively close position of the at least one revolving roller, the at least one guiding mechanism comprising:

at least one guiding groove having a length sufficient to allow the at least one revolving roller to move between the relatively distant position and the relatively close position; and at least one guiding plug operatively engageable with the at least one guiding groove to slide along the at least one guiding groove when the at least one revolving roller is moved between the relatively distant position and the relatively close position.

11. The curved belt conveyor according to claim 9, wherein the connecting and adjusting element comprises:

an adjusting bolt engageable into the through threaded opening of the folded plate of the elongated plate of the at least one connecting bridge, the adjusting bolt having a thrust surface configured to act against the striker plate to move the elongated plate and the at least one connecting bridge with respect to the structural bar and move the at least one revolving roller between the relatively distant position and the relatively close position; and a coupling nut aligned to with the through threaded opening of the folded plate of the elongated plate of the at least one connecting bridge according to a position interposed between the folded plate and the at least one revolving roller, the coupling nut being configured to engage the adjusting bolt to adjust the position of the at least one revolving roller between the relatively distant position and the relatively close position.

12. The curved belt conveyor according to claim 1, wherein the curved top portion comprises a plurality of structural rods configured to define a supporting assembly, the supporting assembly having an opening that corresponds with the arched narrow side of the curved top portion.

13. The curved belt conveyor according to claim 12, wherein the supporting assembly of the curved top portion comprises:

a first plurality of radial structural rods interconnected with at least one structural transversal rod; and a second plurality of radial structural rods interconnected with the at least one structural transversal rod, the first plurality of radial structural rods being overlaid with the second plurality of radial structural rods, the supporting assembly being closed at the arched wide side of the curved belt conveyor by vertical elements and being openable at the arched narrow side by removing a protective carter case.

14. The curved belt conveyor according to claim 1, wherein the curved top portion of the supporting structure is liftable with respect to the base.

15. The curved belt conveyor according to claim 1, wherein the curved top portion of the supporting structure is swivably engaged to the base, the curved top portion being pivotable between a working position, wherein the endless conveyor belt is substantially horizontal or oriented to allow an object or an article to advance along the curved advancing path of the curved top portion and a maintenance position, wherein the arched narrow side is raised with respect to the base and the arched wide side is turned towards the floor.

16. The curved belt conveyor according to claim 12, wherein the supporting assembly of the curved top portion of the supporting structure comprises a first plurality of substantially radial structural rods and a second plurality of substantially radial structural rods placed below the first plurality of substantially radial structural rods, wherein in working conditions, the endless conveyor belt has an upper portion placed above the first plurality of substantially radial structural rods and a lower portion placed between the first plurality of substantially radial structural rods and the second plurality of substantially radial structural rods, wherein each of the first plurality of substantially radial structural rods and each of the second plurality of substantially radial structural rods has a free end in communication with the arched narrow side of the curved top portion, the free ends of the first plurality of substantially radial structural rods being unconnected to the free ends of the second plurality of substantially radial structural rods at the arched narrow side, wherein each upper radial structural rod of the first plurality of substantially radial structural rods is connected through a connection element to a respective lower radial structural rod of the second plurality of substantially radial structural rods at the arched wide side and the lower portion of the endless conveyor belt is housed within a space defined by the upper radial structural rod, the lower radial structural rod, and the connection element, and wherein a connection mechanism connects the at least one revolving roller, that is movable to at least one upper radial structural rod of the first plurality of substantially radial structural rods, the connection mechanism connecting one end of the at least one revolving roller that is movable to one free end of the at least one upper radial structural rod at the arched narrow side.

17. The curved belt conveyor according to claim 16, wherein each upper radial structural rod of the first plurality of substantially radial structural rods is connected through an element to a respective lower radial structural rod of the second plurality of substantially radial structural rods at the arched wide side of the curved top portion to form a "C"-shaped structure.

18. The curved belt conveyor according to claim 1, wherein the at least two revolving rollers lie substantially in a plane of a first plurality of substantially radial structural rods and are located on a respective external lateral side of the first plurality of substantially radial structural rods.

19. A curved belt conveyor comprising:

a supporting structure having a base for supporting the curved belt conveyor on a floor and a curved top portion engaged to the base, the curved top portion defining at least one curved advancing plane for one or more objects and/or articles to be moved along a curvilinear advancing path and being provided with an arched wide side and an arched narrow side opposite each other; and an endless conveyor belt operatively engaged to the curved top portion of the supporting structure to define the curved advancing plane of the curved top portion, the endless conveyor belt moving at least partially around at least two revolving rollers rotatively engaged to the curved top portion of the supporting structure, at least one revolving roller of the at least two revolving rollers being movable with respect to the other roller of the at least two revolving rollers between a relatively distant position wherein the endless conveyor belt is kept under tension being not removable from the at least two revolving rollers and a relatively close position wherein the endless conveyor belt is loose and removable from the at least two revolving rollers, wherein the curved top portion of the supporting structure comprises:

a plurality of structural rods configured to define a supporting assembly having an opening corresponding with the arched narrow side of the curved top portion of the curved belt conveyor and being closed at the arched wide side of the curved top portion of the curved belt conveyor by elements, wherein a first plurality of substantially radial structural rods and a second plurality of substantially radial structural rods are placed below the first plurality of substantially radial structural rods, wherein in working conditions, the endless conveyor belt has an upper portion placed above the first plurality of substantially radial structural rods and a lower portion placed between the first plurality of substantially radial structural rods and the second plurality of substantially radial structural rods, each of the first plurality of substantially radial structural rods and each of the second plurality of substantially radial structural rods having a free end in communication with the arched narrow side of the curved top portion, the free ends of the first plurality of substantially radial structural rods being separate from the free ends of the second plurality of substantially radial structural rods at the arched narrow side allowing the endless conveyor belt to be removed through the arched narrow side of the curved top portion of the supporting structure; and a protective case removably engaged at the arched narrow side of the curved top portion of the curved belt conveyor, the supporting assembly being openable at the arched narrow side of the curved top portion of the curved belt conveyor by removing the protective case and being closable at the arched narrow side of the curved top portion of the curved belt conveyor by applying the protective case.

20. A curved belt conveyor comprising:

a supporting structure having a base for supporting the curved belt conveyor on a floor and a curved top portion engaged to the base, the curved top portion defining at least one curved advancing plane for one or more objects and/or articles to be moved along a curvilinear advancing path and being provided with an arched wide side and an arched narrow side opposite each other; and an endless conveyor belt operatively engaged to the curved top portion of the supporting structure to define the curved advancing plane of the curved top portion, the endless conveyor belt moving at least partially around at least two revolving rollers rotatively engaged to the curved top portion of the supporting structure;

wherein at least one revolving roller of the at least two revolving rollers is movable with respect to the other roller of the at least two revolving rollers between a relatively distant position, wherein the endless conveyor belt is kept under tension and is not removable from the at least two revolving rollers, and a relatively close position, wherein the endless conveyor belt is loose and removable from the at least two revolving rollers, through the arched narrow side of the curved top portion of the supporting structure;

wherein the curved top portion of the supporting structure is liftable with respect to the base.

* * * * *